United States Patent Office 2,730,382
Patented Jan. 10, 1956

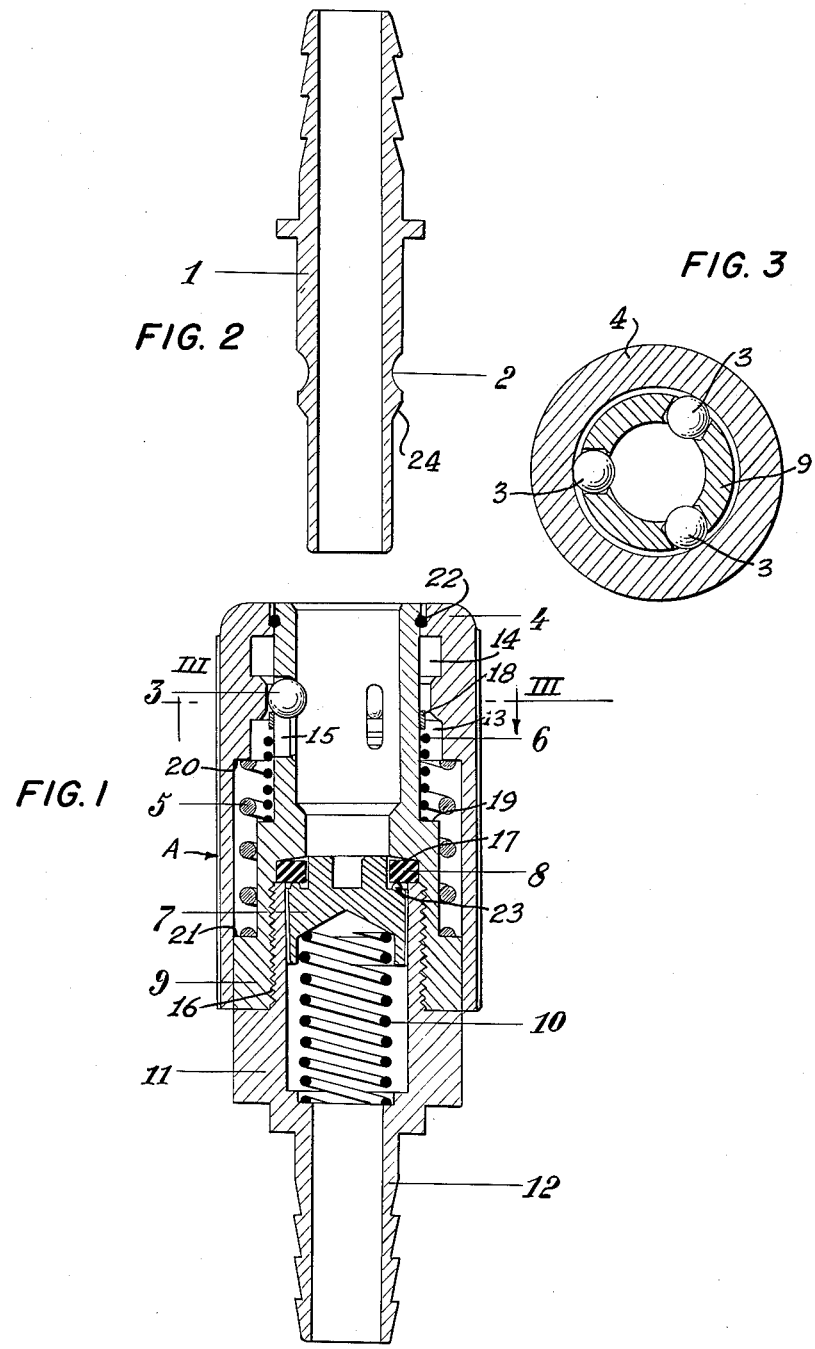

2,730,382
AUTOMATIC COUPLING FOR PIPES

Stefano De Mastri, La Spezia, Italy, assignor to R. K. Price Associates, Inc., New York, N. Y., a company of New York Application October 17, 1952, Serial No. 315,323

Claims priority, application Italy October 19, 1951

2 Claims. (Cl. 285—97.3)

This invention relates to a coupling device for hoses.

It is an object of the invention to provide an automatic coupling device by means of which two portions of a hose are joined to each other, one of the two portions being connected to a fluid source and the other portion being arranged to receive the said fluid. The coupling of the two portions takes place by snap action upon introducing a male member fitted to the second portion of the hose into the female member fitted to the first portion of the hose. The separation of the two portions of the hose from each other takes place by operating on the outer surface of the female member fitted to the first portion of the hose.

It is a further object of the invention to provide a coupling device having a simple structure, safe operation and low cost.

Further objects of the invention will be apparent from the following detailed description taken in conjunction with the accompanying drawing in which Fig. 1 is a vertical section of the female coupling member to be fitted to the portion of the hose connected to a fluid source.

Fig. 2 is a vertical section of the male member to be fitted to the second portion of the hose; and Fig. 3 is a cross-section taken along line III—III of Fig. 1.

Referring now to the drawing, the coupling device comprises a female coupling body A which is connected to the hose supplying the fluid. Inside the said body is introduced, when the two portions of the hose, not shown, have to be connected to each other, the male member 1, which is fitted to the receiving portion of the hose.

The body A comprises a shell member 9 centrally bored to receive the lower end of member 1. Shell member 9 has a threaded inner portion 16 for threaded engagement with a plug 11 provided with a stem 12 for connection with the fluid supplying hose.

Shell member 9 at the interior comprises two portions of different diameter. Underneath the lower portion of smaller diameter and above the threaded portion 16 a seat 17 is formed for a rubber washer 8, against which a valve 7 abuts located in a cavity of plug 11, said valve being biased by a spring 10. Valve 7 has a hexagonal cross section to permit the passage of fluid along the sides of the hexagon. Seat 17 for washer 8 has the sides inclined against which washer 8 presses when urged by the pressure of the fluid.

The sealing of the joint is insured by the washer 8, also when the valve 7 is not present. Because of the inclination of the sides of the seat 17 the greater the pressure of the fluid the greater is the deformation of the rubber washer 8 to abut against the inclined sides of the seat 17 and the tighter is the sealing.

In the lateral wall of the shell member 9 three rectangular openings 15 are made, having the greater side parallel to the axis of the coupling body, angularly spaced from each other and in each of the said openings a ball 3 is arranged to ensure the snap action coupling of member 1 to the body A. Balls 3 bear on a ring 18 against which a spiral spring 6 abuts mounted on the shell member 9. The latter has the outer surface formed with three zones having different diameters which form two steps; on the first step 19 of said steps the spring 6 bears. On the shell member 9 a cylindrical sleeve 4 is mounted which has at the interior a circular groove 14, wherein the balls 3 may penetrate as will be described later. Underneath the said groove a recess 13 is made wherein the balls 3 may also penetrate during the introduction of member 1 into the shell member 9. Underneath the recess 13 the inner diameter of the sleeve 4 becomes greater forming a shoulder 20 upon which bears a spiral spring 5 which at the other end bears on the second step 21 formed on the outer surface of shell member 9. Sleeve 4 is connected to shell member 9 by means of a metallic wire 22 which abuts against a step made in the upper part of the inner surface of sleeve 4 and penetrates into a circular groove made in the shell member 9.

The operation of the coupling device is as follows. Upon introducing the stem of member 1 into the shell member 9, the shoulder 24 of the faucet 1 abuts against the balls 3 and cause the latter to slide axially downwardly compressing spring 6 until the balls penetrate into the recess 13. When the circular groove 2 of the member 1 is flush with the balls, the latter urged by spring 6 penetrate into such groove and lock member 1 to the coupling body A. Simultaneously, the end of member 1 penetrates into the washer 8 and abuts against the valve 7 pushing the latter downward, thus opening the passage upwardly for the fluid along the sides of the hexagon comprising the outer surface of valve 7. The tightness along the outer surface of member 1 is ensured by means of washer 8 which abuts against the inclined seat 17 and by so doing presses its inner edge against the outer surface of member 1.

When member 1 is to be removed from the coupling body A, sleeve 4 is caused to slide against the action of spring 5 until the circular groove 14 is flush with balls 3, thus permitting the latter urged by spring 6 to penetrate into such groove, and the member 1, which is urged upwardly by valve 7 and spring 10 can be removed. Simultaneously, valve 7 urged by spring 10 rises and presses by its edge 23 against the washer 8, shutting off further flow of fluid.

The coupling device above described may be used also without the valve 7 when continuous flow between the two portions of the hose is desired.

It is thought that the invention and its advantages will be understood from the foregoing description and it is apparent that various changes may be made in the construction and arrangement of the parts without departing from the spirit and scope of the invention or sacrificing its material advantages, the process and the article hereinbefore described being merely a preferred embodiment of the invention.

I claim:

1. A coupling device for joining two portions of a hose the first portion of which is arranged to supply a fluid and the second to receive the fluid, comprising a male member adapted to be fitted to said second portion, a female coupling body adapted to be fitted to said first portion and receiving an end of said male member, said male member having a circular groove formed in the part to be introduced into said coupling body and a shoulder adjacent to said groove, said coupling body comprising a shell member having at the interior two zones of different diameter and on its outer surface three zones of different diameter forming a first and a second step, said shell member being provided at the interior with a threaded portion the shell being provided in the part of its wall receiving the male member with three elongated openings angularly spaced from each other the longitudinal axis of the opening being parallel to the axis of the shell, a ball in each of said openings arranged to move axially in the opening and radially with respect of the axis of the shell member, to lock said male member to said coupling body, a sleeve mounted on said shell member and slidably connected thereto, said sleeve being provided with a shoulder, a recess adjacent to said shoulder and a circular groove above said recess and adjacent one end of the sleeve, a first spring mounted on the shell member between said balls and said first step existing on the outer surface of the shell body for biasing said balls, a second spring mounted on the outer surface of the shell member and compressed between the said second outer step of the shell member and the said shoulder of said sleeve, a plug screwed to the threaded portion of the said shell member for connection with a portion of the hose, said recess in the inner wall of the said sleeve being opposite to and receiving said balls during the introduction of the end of said male member into said shell member, said groove made in the inner wall of said sleeve being opposite to and receiving said balls during the removal of the said male member from said shell member and said balls being held in the groove on said male member by the portion of the sleeve intermediate the recess and groove to join said member to said coupling body.

2. A coupling device for joining two portions of a hose the first portion of which is arranged to supply a fluid and the second to receive the fluid, comprising a male member adapted to be fitted to said second portion, a female coupling body adapted to be fitted to said first portion and receiving an end of said male member, said male member having a circular groove formed in the part to be introduced into said coupling body and a shoulder adjacent to said groove, said coupling body comprising a shell member having at the interior two zones of different diameter and on its outer surface three zones of different diameter forming a first and a second step, said shell member being provided at the interior with a threaded portion and a seat located above said threaded portion and having inclined sides, a rubber sealing washer arranged in said seat, the shell being provided in the part of its wall receiving the male member with three elongated openings angularly spaced from each other the longitudinal axis of the opening being parallel to the axis of the shell, a ball in each of said openings arranged to move axially in the opening and radially with respect of the axis of the shell member, to lock said male member to said coupling body, a sleeve mounted on said shell member and slidably connected thereto, said sleeve being provided with a shoulder, a recess adjacent to said shoulder and a circular groove above said recess and adjacent one end of the sleeve, a first spring mounted on the shell member between said balls and said first step existing on the outer surface of the shell body for biasing said balls, a second spring mounted on the outer surface of the shell member and compressed between the said second outer step of the shell member and the said shoulder of said sleeve, a plug screwed to the threaded portion of the said shell member for connection with a portion of the hose and abutting against said washer in the seat of said shell member, said recess in the inner wall of the said sleeve being opposite to and receiving said balls during the introduction of the end of said male member into said shell member, said groove made in the inner wall of said sleeve being opposite to and receiving said balls during the removal of the said male member from said shell member and said balls being held in the groove on said male member by the portion of the sleeve intermediate the recess and groove to join said member to said coupling body.

References Cited in the file of this patent

UNITED STATES PATENTS

| | | |
|---|---|---|
| 2,279,146 | Schneller | Apr. 7, 1942 |
| 2,536,702 | Scheiwer | Jan. 2, 1951 |